Aug. 18, 1964  H. M. AUGSBURGER  3,145,246
ELECTRIC HEATING MEANS AND METHOD FOR HEATING GLASS NEAR
THE PERIMETER OF THE WORKING ZONE OF A GLASS FEEDER
Original Filed May 14, 1957  2 Sheets-Sheet 1

INVENTOR.
HERBERT M. AUGSBURGER
BY J. R. NELSON
LEONARD D. SOUBIER
ATTORNEYS

INVENTOR.
HERBERT M. AUGSBURGER
BY J. R. NELSON
LEONARD D. SOUBIER
ATTORNEYS

United States Patent Office

3,145,246
Patented Aug. 18, 1964

3,145,246
ELECTRIC HEATING MEANS AND METHOD FOR HEATING GLASS NEAR THE PERIMETER OF THE WORKING ZONE OF A GLASS FEEDER
Herbert M. Augsburger, Sylvania, Ohio, assignor to Owens-Illinois Glass Company, a corporation of Ohio
Original application May 14, 1957, Ser. No. 659,091. Divided and this application Apr. 28, 1960, Ser. No. 35,859
4 Claims. (Cl. 13—6)

This invention relates to method and apparatus for conditioning molten glass received in a glass feeder working zone, and more particularly to heating the glass therein at an annular area near the periphery of the working zone by Joule effect of electric current passed between electrodes submerged in the glass in the working zone to maintain it at a uniform working temperature prior to delivery for further manufacture.

In the delivery of molten glass from the working zone of a glass feeder, it is desirable that the glass be of uniform temperature. It is particularly important that the glass be of uniform temperature in a horizontal plane near its point of withdrawal from the working zone.

This invention lends itself readily to use with a glass furnace in which the glass is melted and refined therein and then channeled through a forehearth section of the feeder terminating in a bowl or feeder spout defining a working zone container where the glass is then withdrawn through one or more bottom orifices. However, it is contemplated by this invention that it may also be readily applied to a glass working zone of a feeder wherein the glass is withdrawn therefrom by a vacuum gathering ram apparatus, a hand gathering tool or an "up-draw" tube forming apparatus.

One of the main causes of non-uniform temperature in the glass in the working zone results from the conduction of heat through the refractory walls of the working zone container.

It is, therefore, an object of the present invention to apply heat to an annular area near the perimeter of the glass mass contained in the working zone by the Joule effect of electric current flowing between adjacent electrodes arranged circuitously at said perimeter area to counterbalance the heat loss by conduction and radiation through the working zone container walls, and thereby maintain the glass mass at a uniform temperature.

Another object of the invention is to provide a method for accomplishing the aforesaid object by passing a main electric current through the glass mass between peripherally adjacent electrodes in the glass mass near the periphery of the working zone, and passing a minor or lesser amount of current through the glass between peripherally non-adjacent electrodes, the minor current flow being limited by having zero current flow between electrodes that are located substantially diametrically opposite each other.

The specific nature of this invention, as well as other objects and advantages thereof, will become apparent to those skilled in the art from the following detailed description, taken in conjunction with the annexed sheets of drawings on which, by way of preferred example only, are illustrated several embodiments of this invention.

Figure 1:
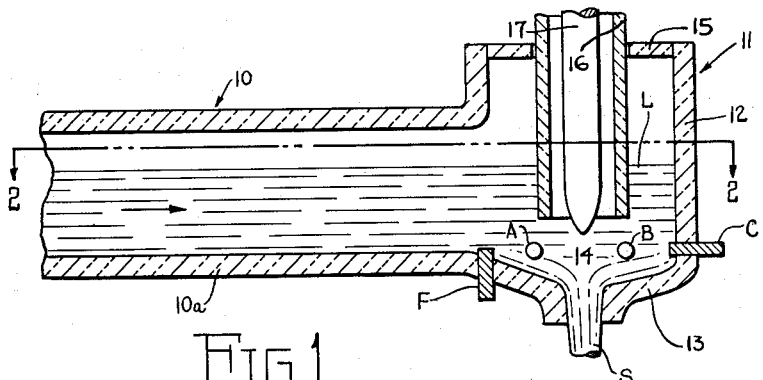
FIG. 1 is a sectional elevational view through the center of the outer portion of a forehearth channel of a glass feeder terminating in a feeder spout, showing a form of the invention utilizing six electrodes arranged at equally spaced peripheral distances between their inner tips near the perimeter of the feeder spout bowl and illustrates one form of the invention.

In FIG. 1, an enclosed refractory forehearth channel 10, connected at its outer end to a refractory feeder spout bowl, designated generally at reference numeral 11, receives refined molten glass from a refining zone of a glass furnace (not shown), and feeds it to bowl 11 to maintain a desired working level L therein. Bowl 11 is comprised of substantially circular side wall 12, when viewed in plan (FIG. 2) integrally formed with a bottom wall 13. Bottom wall 13 is provided with one or more vertically disposed orifice outlets 14 which are generally substantially circular in cross section. The feeder bowl 11 thus provides one form of working zone in a glass feeder wherein glass is conditioned and withdrawn therefrom for further manufacture.

At the top of bowl 11 is a cover 15 to enclose said bowl and cover 15 is provided to receive a refractory hollow cylindrical sleeve 16 therethrough. Sleeve 16 is supported at its outer end by conventional means (not shown) for continuously rotating it and holding its lower end submerged in the glass in bowl 11. A needle plunger 17 constructed of refractory, is vertically reciprocated concentrically inside sleeve 16 so that the lower end of plunger 17 is submerged in glass in bowl 11 at all times. Sleeve 16 and plunger 17 are a well-known means for mixing the glass in bowl 11 and controlling the issuance of the stream of glass S through the underlying orifice 14. This structure (16 and 17) forms no part of the invention, but is merely shown as one representative type of well-known feeder device to which this invention may be applied.

Figure 2:
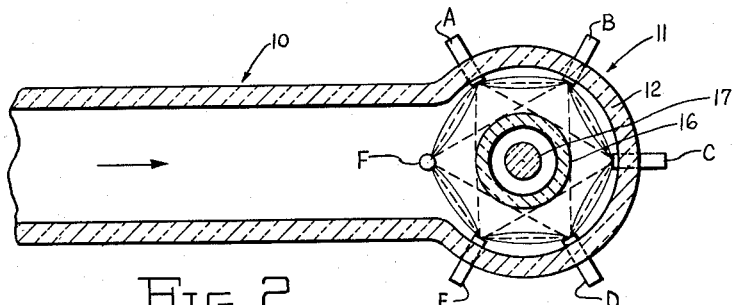
FIG. 2 is a sectional plan view taken along line 2—2 of FIG. 1, and illustrates heating by the method of the invention.

In the lower portion of bowl 11 are six electrodes, designated by reference letters A, B, C, D, E, and F, inserted laterally through side wall 12 and bottom wall 13 (FIG. 1) and disposed in a common horizontal plane, so that the innermost tips of the electrodes are disposed in a circular path near the internal perimeter of bowl 11 and spaced at equal chordal distances one from the other (FIG. 2). The electrodes may be just as readily inserted through bottom wall 13, if so desired. Viewed in elevation, the horizontal plane of the inner tips of the electrodes may be selected near bottom wall 13 and parallel with the floor or bottom wall 10a of forehearth 10 (FIG. 1).

Figure 3:
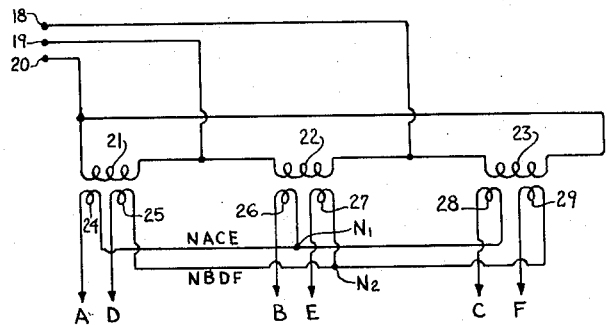
FIG. 3 is a schematic wiring diagram of the power circuit for energizing the electroles of FIGS. 1 and 2.

Electrodes A through F are electrically energized by connection to a power circuit, diagrammatically illustrated in FIG. 3, which will presently be described. When energized, the resulting current flow between the electrodes apply heat to the glass by Joule effect.

In FIG. 3, a three-phase main line supply, represented by terminals 18, 19 and 20, is connected, such as the delta connection shown, to primary transformer windings 21, 22 and 23. The secondary transformer windings 24 through 29 are connected similar to a six-phase double Y connection, except that both secondary windings corresponding to each primary transformer windings are connected with the same polarity. More specifically, the transformer connections are made to have two three-phase circuits in phase with each other. For example, the secondaries 24 and 25 are connected to their respective neutrals $N_1$ and $N_2$, and to electrodes A and D. Similarly secondaries 26 and 27 are respectively connected to neutrals $N_1$ and $N_2$ and to electrodes B and E. Secondaries 28 and 29 are likewise connected, respectively, to neutrals $N_1$ and $N_2$ and electrodes C and F. Neutrals $N_1$ and $N_2$ are not connected. The just described power circuit connections through the transformer thereby comprises two three-phase circuits in phase with one another.

Figure 4:
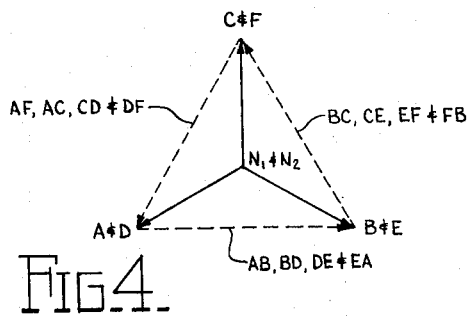
FIG. 4 is a vector diagram of the voltages for the circuit shown in FIG. 3.

FIG. 4, is a vector diagram of the voltage relations of the above-described power circuit. Since the two three-phase circuits are in phase, the vector diagram consists of two superimposed three-phase vector diagrams that are identical and neutrals $N_1$ and $N_2$ coincide. Vectors $A-N_1$, $C-N_1$ and $B-N_1$ are voltages to neutral of electrodes A, C and B of one three-phase circuit, and vectors $D-N_2$, $F-N_2$ and $E-N_2$ are voltages to neutral of electrodes D, F, and E of the other three-phase circuit. The voltage between adjacent electrodes, such as A–B for example (FIG. 2), is the vector sum of voltages $A-N_1$ and $B-N_1$ (FIG. 4) or a magnitude 1.732 times the voltages to neutral. Similarly, the voltage between adjacent electrodes of different three-phase circuits, such as F–A for example (FIG. 2), is the vector sum of the voltages $F-N_2$ and $A-N_1$, (FIG. 4), or a magnitude of 1.732 times the voltages to neutral.

The voltage between alternately adjacent electrodes, such as B–D (FIG. 2), is the vector sum of the voltages to neutral of these electrodes, or $B-N_1$ and $D-N_2$ (FIG. 4), and is therefore of the same magnitude. However, this later voltage B-D, etc. is applied over a physical path through the glass which is 1.732 times the length of the path through the glass between adjacent electrodes, such as B-C, etc. Since the power applied, by Joule's principle, and the resultant heat is directly proportional to the square of the voltage and inversely proportional to the resistance or length of the physical path through the glass, the resultant heat that is applied along the path between adjacent electrodes (B-C, etc.) and the heat applied along the path between alternately adjacent electrodes (B-D, etc.) are demonstrated by the following ratio (where P denotes power consumed between electrodes, E denotes voltage between electrodes and R the resistance of the glass per unit of length of glass path):

$$\frac{P_{B-C}}{P_{B-D}} = \frac{E^2/R}{E^2/\sqrt{3}R} = \sqrt{3} \text{ or } 1.732$$

Therefore, $P_{B-C} = 1.732\, P_{B-D}$

Since power is measured by the result of current (I) squared times the resistance (R), the above relation of currents may be stated:

$$I_{B-C} = 1.732\, I_{B-D}$$

Thus, the amount of current flow between adjacent electrodes is 1.732 times the magnitude of curren flow between alternately adjacent electrodes of the system.

No voltage or current flow exists between diametrically opposite electrodes, such as A–D, etc. (FIG. 2), as is obvious from inspection of the vector diagram (FIG. 4). Accordingly, a main current flow, indicated by looped lines in FIG. 2, is provided between adjacent electrodes and a minor or lesser current, indicated by dashed lines in FIG. 2, is provided between alternately adjacent electrodes and no current exists between diametrically opposite electrodes. The effect of these currents is to apply heat to the glass centained in bowl 11 near the perimeter of the glass mass where it is subject to greatest heat loss through the refractory walls. In this manner, the glass mass may be maintained at a uniform temperature advantageous before feeding the glass for further manufacture.

Figure 5:
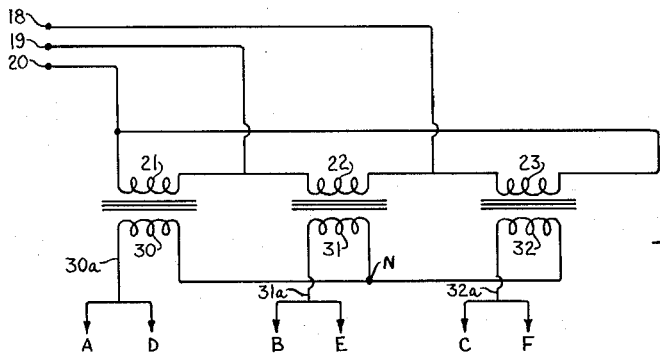
FIG. 5 is a schematic wiring diagram of a modified form of power circuit, similar to FIG. 3, for the electrode arrangement shown in FIGS. 1 and 2.

FIG. 5 is a wiring diagram illustrating a modification of the power circuit of FIG. 3 for energizing the electrodes A through F of FIG. 2 in the same manner as previously described. A three-phase main line power source 18, 19 and 20 is connected across the corresponding primary transformer windings 21, 22 and 23, in the same manner. The secondaries 30, 31 and 32 are each a single continuous secondary winding. One lead of each of secondaries 30, 31 and 32 are connected to a neutral point N. The other lead of each of said secondaries is connetced in parallel across diametrically opposite electrodes (FIG. 2), such as lead 30a of secondary winding 30 connected in parallel across electrodes A and D, lead 31a of secondary winding 30 connected in parallel across electrodes B and E, and lead 32a of secondary winding 32 connected in parallel across electrodes C and F. This has the same effect as connecting neutrals $N_1$ and $N_2$ of FIG. 3, and therefore, the vector diagram of FIG. 4 applies to this connection in the same relationship as previously described.

Figure 6:
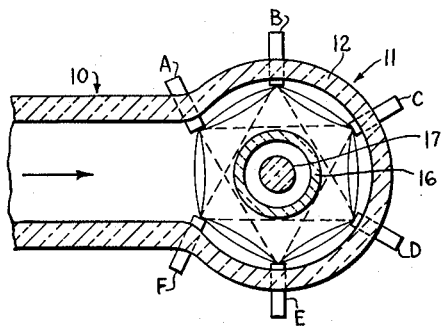
FIG. 6 is a sectional plan view, similar to FIG. 2, showing a modified arrangement of the electrodes.

Referring to FIG. 6, a modification of the electrode arrangement of FIGS. 1 and 2 will now be described. The six electrodes A through F are inserted through side wall 12 of bowl 11 along a horizontal plane. The electrode positions are moved counterclockwise approximately 30° about the perimeter of bowl 11 from those in FIG. 2, as viewed in plan, so that electrodes A and F now lie substantially opposite each other across the entrance into bowl 11 for receiving molten glass from the channel of forehearth 10. Electrodes B, C, D and E are disposed so their inner tips lie on a circle drawn on a horizontal plane in bowl 11, and the distance between the electrode tips are equal; that is to say between electrodes, the path B-C, C-D and D-E are equal. Electrodes A and F may similarly be inserted from their opposed positions at the entrance to bowl 11 to lie on the aforementioned circle path so that the lateral distances from tip to tip between electrodes E–F, F–A and A–B are equal to the other paths B–C, etc. However, in this form of the invention it is not necessary to do so.

As shown in FIG. 6, electrodes A and F are positioned to lie outside the circular path at the tips of electrodes B, C, D and E, just described, by a distance limited so that throughout the entire arrangement, the distance between adjacent electrode tips is less than the distance between the tips of any given electrode and its alternately adjacent electrode; for example, the distance between electrode tips A–F is less the distance between electrode tips A–E or A–C. However, in this arrangement (FIG. 6), the electrodes A and F are positioned so that the distance between their tips is greater than the peripheral distance between all other adjacent electrodes.

The electrodes A through F are then energized by connection into either of the power circuits described above under FIGS. 3 and 5, so that a major current, represented by looped lines in FIG. 6, will flow between adjacent electrodes, and a minor or lesser current will flow between alternately adjacent electrodes, as represented by dashed lines in FIG. 6. Since the current flow between electrodes varies inversely with the length of the physical path therebetween and power consumed is directly proportional to the square of the current, as previously demonstrated herein, by having the path between electrodes spaced across the entrance to the working zone, that is electrodes A–F across the entrance to bowl 11, at a greater distance than the path between adjacent electrodes near the perimeter walls of the container, more heat from the major current flow will be applied about the perimeter of bowl 11 near its wall than across the entrance thereto. This is found advantageous for the following reason.

Glass in forehearth 10 is maintained at a desired temperature and subject to less cooling or heat loss than glass near the perimeter of bowl 11. Therefore, the glass entering bowl 11 and flowing past electrodes A and F at this point has been subjected to less heat loss than the glass near the perimeter of bowl 11, for example the glass between electrodes C and D, and the glass needs less heat supplied to it at the former point than the latter. This arrangement of electrodes (FIG. 6) permits the glass to be controlled more uniformly in temperature throughout.

The glass near the center of bowl 11 is not subject to the same rate of heat loss as the glass near the perimeter of the bowl. However, since the alternately adjacent electrodes F–B, A–C, B–D, etc., are at a greater distance than any of the adjacent electrodes F–A, A–B, B–C, etc., the current flow between any of the former is less than between any of the latter. As a consequence, less heat is applied to the glass near the center of bowl 11 than near the perimeter thereof, and no heat is supplied to the glass at the center of bowl 11. The temperature of the glass in the working zone may thereby be controlled substantially uniformly.

Having described exemplary forms of electrode arrangements disposed in a selected horizontal plane of the working zone, it should be understood that in each case more than one such electrode arrangement may be utilized at different horizontal planes selected at spaced vertical distances from each other. Any multiple of the electrode arrangement for any form of the invention herein disclosed or a multiple of the electrode arrangements which comprises a combination of the various forms of the invention herein disclosed are readily adaptable and should be obvious to one ordinarily skilled in this art.

It will, of course, be understood that various other details of construction may also be modified through a wide range without departing from the principles of this invention, and it is, therefore, not the purpose to limit the patent granted hereon otherwise than necessitated by the scope of the appended claims.

This application is a division of application Serial No. 659,091, filed May 14, 1957, now abandoned.

I claim:

1. The method of maintaining a uniform temperature in molten glass contained in a working zone of a glass feeding device of a multi-compartment glass furnace where glass is fed into said feeding device and discharged from said feeding device at spaced points therein comprising passing a main electric heating current in a plurality of adjoining current paths through the glass near the perimeter of the working zone, one of the current paths of said main heating current extending transversely of the point where glass is fed into said working zone and having a lesser heating effect than the other current paths of said main heating current, passing a minor electric heating current in a plurality of adjoining current paths through the glass spaced inwardly in said working zone from the current paths of said main electric heating current, said minor current having a lesser heating effect on the glass than said main current, and maintaining the directions of the current paths of said currents to prevent current flow through the central portion of the working zone.

2. The method of maintaining a uniform temperature in molten glass contained in a working zone of a glass feeding device of a multi-compartment glass furnace where glass is fed into said feeding device and discharged from said feeding device at spaced points therein, comprising passing two three-phase currents in phase with each other through the glass with a major amount of the current of each phase of each of said three-phase currents passing through the glass near the perimeter of the working zone and meeting a phase of the other of said three-phase currents at an adjacent electrode, one phase of one of said three-phase currents passing a major amount of its current through the glass near the perimeter of the working zone and transversely of the point where glass is fed into said working zone, said one phase of current having a lesser heating effect than the other major amounts of current passing through the glass near the perimeter of the working zone, a minor amount of the current of each phase of each of said currents passing through the glass inwardly of the path of the said major amounts of current and meeting a phase of the same three-phase current at an alternately adjacent electrode, the path of each phase of the minor currents being longer than the path of each phase of the major currents, and controlling the flow of said major and minor currents to prevent current flow between diametrically opposed electrodes in said working zone.

3. In an electrically heated working zone of a glass feeding device of a multi-compartment glass furnace wherein molten glass is fed into said feeding device and withdrawn from said feeding device at spaced points, a working level glass being maintained therein, and having a bottom wall and enclosing side wall defining the perimeter of said working zone, the combination of six electrodes inserted into the glass in said working zone, said electrodes having their inner tips near said perimeter of the working zone and disposed thereabouts at spaced positions in a substantially circular arrangement in at least one horizontal plane, said circular arrangement being concentric with said glass withdrawal point and the lateral distance between any two adjacent electrodes in said circular arrangement being less than the distance between any two non-adjacent electrodes, the inner tips of two of said electrodes being near the perimeter of the working zone on either side of the point at which glass is fed into said working zone, the lateral distance between said last mentioned two electrodes being greater than the lateral distance between other adjacent electrodes and less than the distance between any two non-adjacent electrodes, an electrical power source, and circuit means for connecting said electrodes to said power source to cause current to flow through the glass between said electrodes to thereby apply heat to an annular portion of the glass in said working zone, said circuit connection preventing current flow throughth the glass at the withdrawal point of the working zone between diametrically opposed electrodes.

4. The method of maintaining a uniform temperature in molten glass contained in a working zone of a glass feeding device of a multi-compartment glass furnace where glass is fed into said feeding device and discharged from said feeding device at spaced points therein comprising passing a main electric heating current in a plurality of adjoining current paths to form an endless current path through the glass near the perimeter of the working zone, one of the current paths of said main heating current extending transversely of the point where glass is fed into said working zone, simultaneously passing a minor electric heating current in a plurality of end-to-end adjoining current paths through the glass spaced inwardly in said working zone from the current paths of said main electric heating current, said minor current having a lesser heating affect on the glass than said main current, and maintaining the directions of the current paths of said currents to prevent current flow through the central portion of the working zone.

References Cited in the file of this patent
UNITED STATES PATENTS

| | | |
|---|---|---|
| 1,680,543 | Howard | Aug. 14, 1928 |
| 1,999,744 | Wadman | Apr. 30, 1935 |
| 2,018,884 | Ferguson | Oct. 29, 1935 |